United States Patent [19]

Mori et al.

[11] Patent Number: 4,468,808
[45] Date of Patent: Aug. 28, 1984

[54] FEATURE EXTRACTION SYSTEM FOR DIGITIZED CHARACTER INFORMATION

[75] Inventors: Shunji Mori, Kashiwa; Hiromitsu Yamada, Sakura; Kunihiko Takeuchi, Kawasaki; Michihisa Do, Tokyo, all of Japan

[73] Assignees: Agency of Industrial Science and Technology; Tokyo Keiki Co., & Ltd.; Totec Co., Ltd., all of Tokyo, Japan

[21] Appl. No.: 226,091

[22] Filed: Jan. 19, 1981

[30] Foreign Application Priority Data

Jan. 21, 1980 [JP] Japan .................................. 55-4520

[51] Int. Cl.³ .............................................. G06K 9/46
[52] U.S. Cl. ......................................... 382/20; 382/25
[58] Field of Search ........... 340/146.3 AC, 146.3 AE, 340/146.3 J, 146.3 R; 382/20, 25, 26; 358/260–263

[56] References Cited

U.S. PATENT DOCUMENTS

| | | | |
|---|---|---|---|
| 3,178,688 | 4/1965 | Hill et al. | 340/146.3 AC |
| 3,541,511 | 11/1970 | Hiroshigenchi et al. | 340/146.3 AC |
| 3,713,098 | 1/1973 | Muenchhausen et al. | 340/146.3 AC |
| 4,048,615 | 9/1977 | Chuang et al. | 382/20 |
| 4,061,998 | 12/1977 | Ito | 382/20 |
| 4,155,072 | 5/1979 | Kawa | 382/20 |
| 4,189,711 | 2/1980 | Frank | 340/146.3 AC |
| 4,193,056 | 3/1980 | Morita et al. | 382/20 |

*Primary Examiner*—Leo H. Boudreau
*Attorney, Agent, or Firm*—Oblon, Fisher, Spivak, McClelland & Maier

[57] ABSTRACT

Disclosed is an extraction method for optical character recognition systems in which the necessary character features for recognition process are extracted from a character information detected and digitized by an optical scanner. In accordance with this method, the local features of every adjacent two rows or columns of a digitized character pattern on a two-dimensional plane are extracted row by row or column by column and are successively integrated so as to extract in a global manner the respective feature types such as concavity and convexity, loop and connectivity of the character pattern. At the same time, the global feature regions or segments are separated and each of the separated feature segments is coded without any loss of the information. The feature quantity of each segment is obtained on the basis of the coded representation. Any local concavity or convexity noises are eliminated simultaneously with the extraction of the global features.

4 Claims, 20 Drawing Figures

| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| | | d | c | | | | | | | | | | | | | | | | | | | | | | | |
| P | BW | 0 | 0 | | | 1 | 0 | 0 | 0 | 0 | 0 | | 0 | 0 | 1 | 0 | 0 | 0 | 1 | 0 | 1 | 0 | 0 | | 0 | 0 |
| | WB | 0 | 1 | | 0 | 0 | 0 | 1 | 0 | 0 | | 0 | 0 | | 0 | 0 | 1 | 0 | 0 | 1 | 0 | 0 | 0 | 0 | 0 | 0 |
| N | BW | 0 | 0 | | 0 | 0 | 0 | 0 | 0 | 1 | | 0 | 0 | 1 | 0 | 0 | 0 | 0 | 0 | 0 | 1 | 0 | 0 | 0 | 1 | 0 |
| | WB | 0 | 0 | | 0 | 0 | 1 | 0 | 0 | 0 | 1 | 0 | | 0 | 0 | 0 | 1 | 0 | 0 | 0 | 0 | 0 | 0 | 1 | 0 | 0 |
| FEATURE LABEL | | | | | | TD | | LA | | | OD | | RB | | LC | | OU | | | OU | RC | | | | TU | |

(a)

| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| PCR | | 1 | | | | | | 2 | | | | 3 | | | 4 | | 5 | | | | | | | | | |
| NCR | | | | | | 1 | | | | | 2 | | | 3 | | | | | | | 4 | | | | | |
| TYPE | | | | | | TD | | LA | | | OD | | RB | | LC | | OU | | | OU | RC | | | | TU | |
| PBN | | | | | | 1 | | 2 | | | 2 | | 3 | | 4 | | 5 | 5 | | | | | | | | |
| NBN | | | | | | | | 1 | | | 2 | | 2 | 3 | | | | | | | 3 | | | | 4 | |

(b)

LIST

| TYPE | TD | LA | OD | RB | LC | OU | OU | RC | TU |
|---|---|---|---|---|---|---|---|---|---|
| PBN | 1 | 2 | | 2 | 3 | 4 | 5 | 5 | |
| NBN | | 1 | 2 | 2 | 3 | | | 3 | 4 |

RUN LENGTH TABLE

| NXS | 6 | 10 | 14 | 21 |
|---|---|---|---|---|
| NXE | 7 | 11 | 18 | 23 |

(c)

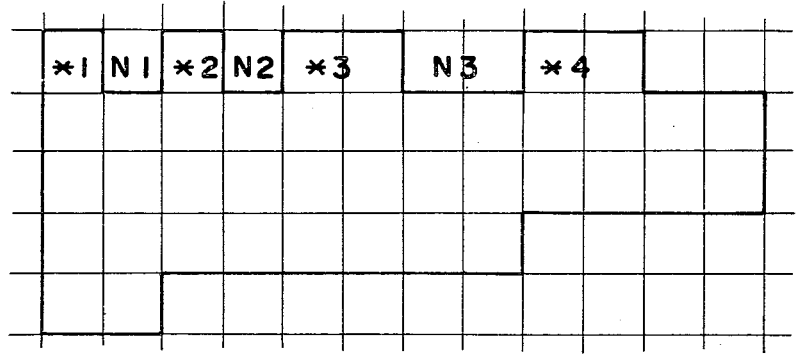
FIG. 10a
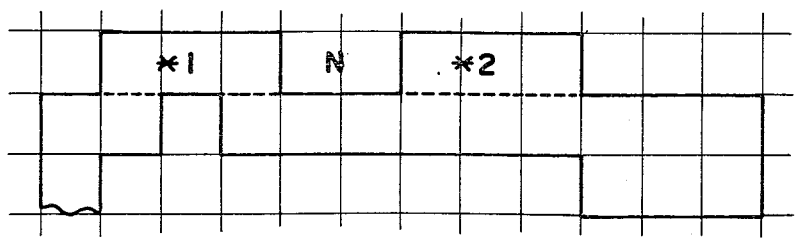
FIG. 10b
FIG. 11
| | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|
| | B | | | | | | | | | | | | | | | | | | | | | | | | | | | | | | | | | |
| | N | | | | | | | | | | | | | | | | | | | | | | | | | | | | | | | | | |
| | A | | | | | | | | | | | | | | | | | | | | | | | | | | | | | | | | | |
| B | BW | 0 | | 0 | 00 | 00 | | 0 | 00 | 0 | | 1 | | 0 | | | 00 | 00 | 0 | | 1 | 1 | 0 | 1 | 0 | 00 | 0 | | 00 | 0 | | 00 | 1 |
| | WB | 0 | | 0 | 00 | 1 0 | | 0 | 00 | 0 | | 0 | | 0 | | | 00 | 1 0 | 0 | | 00 | 1 | 0 | 00 | 1 | 00 | 0 | | 00 | 0 | | 00 | 0 |
| N | BW | 0 | | 0 | 1 0 | 00 | | 1 | 1 0 | 1 | | 1 | | 0 | | | 1 0 | 00 | 1. | | 1 0 | 1 | 1 | 1 0 | 00 | 1 | | 1 0 | 1 | | 1 0 | 1 |
| | WB | 0 | | 1 | 1 0 | 1 0 | | 0 | 1 0 | 0 | | | | 1 | | | 1 0 | 1 0 | 0 | | 1 0 | 00 | 00 | 1 0 | 0 | | 1 0 | 0 | | 1 0 | 0 |
| TYPE | | | | | Ⓣ | LB | | | OD | | RC | | | | | | Ⓣ | LB | | | OD | OU | | RC | LB | | | OD | | | OD | RB |
| LIST B | | | | | | 1 | | | | 1 | | | | | | | | 2 | | | | 3 | 3 | | 4 | | | | | | | |
| (B-N)N | | | | | ① | 2 | | | ③ | | ③ | | | | | | ④ | 5 | | | ⑥ | o | ⑥ | | 7 | | | ⑧ | | | ●9 | 9 |
| N | BW | 0 | 00 | | 1 | | 1 0 | | 1 00 | | 1 0 | | 0 | 00 | 0 | 00 | 1 | | 1 0 | 1 0 | 0 | | 1 0 | | 00 | 1 00 | | 1 0 | 00 | 1 | | | |
| | WB | 0 | 1 0 | | 0 | | 1 0 | | 00 | 1 | 1 0 | | 0 | 1 00 | | 00 | 0 | | 1 0 | 00 | 1 | | 1 0 | | 1 0 | 00 | 1 | 1 0 | 1 0 | 0 | | | |
| A | BW | 0 | 00 | | 0 | | 00 | | 1 0 | 0 | 00 | | 0 | 00 | 1 | | 1 0 | 0 | | 00 | 1 0 | 0 | | 00 | | 00 | 1 0 | 0 | 00 | 00 | 1 | | | |
| | WB | 0 | 1 0 | | 0 | | 00 | | 00 | 0 | 00 | | 1 | 1 0 | 0 | | 1 0 | 0 | | 00 | 00 | 0 | | 00 | | 1 0 | 00 | 0 | 00 | 1 0 | 0 | | | |
| TYPE | | LB | | | OU | | RB | | Ⓣ | | LA | | OD | | | OU | RB | | Ⓣ | | LB | RB | | Ⓣ | LB | RB | | | | | | | |
| LIST N | | ① | | ●2 | | 2 | | ③ | ④ | | o | | ●5 | 5 | | ⑥ | | 7 | 7 | | ⑧ | 9 | 9 | | | | | | | | | | | |
| (N-A) A | | 1 | | | | 1 | | | 2 | | | | 3 | | | 3 | | | | | 4 | 4 | | | 5 | 5 | | | | | | | | |

FIG.12

| FEATURE OF LIST (B-N) | FEATURE OF LIST (N-A) | | DECISION OF NOISE | CANCELLATION | LABEL CHANGE | IDENTIFICATION NUMBER CHANGE |
|---|---|---|---|---|---|---|
| | i | NEXT FEATURE (n) | | | | |
| TU | TD | | × | Ai, Bi → O | | |
| | L | OD | ○ | | | |
| | | R | ○ | | | |
| | | OU | × | Ai, Bi → O | An → LA | A(n⁻) → A(n) |
| | OU | OD | ○ | | | |
| | | R | × | Ai, Bi → O | An → LA | N(n⁻) → N(n) |
| | | OU | × | Ai, Bi → O | | |

| FEATURE OF LIST (N-A) | FEATURE OF LIST (B-N) | | DECISION OF NOISE | CANCELLATION | LABEL CHANGE | IDENTIFICATION NUMBER CHANGE |
|---|---|---|---|---|---|---|
| | i | NEXT FEATURE (n) | | | | |
| TD | TU | | × | Ai, Bi → O | | |
| | L | OU | ○ | | | |
| | | R | ○ | | | |
| | | OD | × | Ai, Bi → O | Bn → LC | B(n⁻) → B(n) |
| | OD | OU | ○ | | | |
| | | R | × | Ai, Bi → O | Bn → LC | N(n⁻) → N(n) |
| | | OD | × | Ai, Bi → O | | |

FIG.13

| PROCESSED FEATURE | GENERATED FEATURE | COMPLETED FEATURE | COMPOSITE FEATURE | CONTINUATION | PRECEDING CONDITION |
|---|---|---|---|---|---|
| TU | $L_1$, $L_4$ | | | | |
| TD | | $L_2$, $L_3$ | | | $L_2$, $L_3$ |
| | | $L_2$, $C(\bar{7})$ | | | $L_2$, $C(\bar{7})$ |
| | | $L_3$, $C(\bar{3})$ | | | $L_3$, $C(\bar{3})$ |
| | | $C(\bar{3})$, $C(\bar{7})$ | | | $C(\bar{3})$, $C(\bar{7})$ |
| | $L_2$ | $L_1$, $L_3$ | | | $L_1$, $L_3$ |
| | $L_2$, $L_3$ | $L_1$, $L_4$ | | | $L_1$, $L_4$ |
| | $L_3$ | $L_2$, $L_4$ | | | $L_2$, $L_4$ |
| | $L_3$ | $L_2$, $C(7)$ | | | $L_3$, $C(7)$ |
| | $L_2$ | $L_3$, $C(\bar{3})$ | | | $L_3$, $C(\bar{3})$ |
| | $L_2$, $L_3$ | $L_1$, $C(7)$ | | | $L_1$, $C(7)$ |
| | $L_2$, $L_4$ | $L_4$, $C(\bar{3})$ | | | $L_4$, $C(\bar{3})$ |
| OU | | | $L + L \rightarrow C$ | | $L$, $L$ |
| | | | $L + C_i \rightarrow C_i'$ | | $L$, $C_i$ |
| | | | $C_{i1} + C_{i2} \rightarrow C_{i1}'$ | | $C_{i1}$, $C_{i2}$ |
| | | | $C_i + C_i \rightarrow O_i$ | | $C_i$, $C_i$ |
| OD | $C_5$ | | | | |
| RA | | | $L_2 \rightarrow C(\bar{3})$ | | $L_2$ |
| | | | | $L_1$ | $L_1$ |
| | | | | $C_i$ | $C_i(\bar{3})$ |
| | | | | $C_i'$ | $C_i(\bar{3})$ |
| RB | | | | $L$ | $L$ |
| | | | | $C$ | $C$ |
| RC | | | | $L_2$ | $L_2$ |
| | $L_2$ | $L_1$ | | | $L_1$ |
| | $L_2$ | $C(\bar{3})$ | | | $C(\bar{3})$ |
| | | | | $C(\bar{3})$ | $C(\bar{3})$ |
| LA | | | | $L_4$ | $L_4$ |
| | | | $L_3 \rightarrow C(\bar{7})$ | | $L_3$ |
| | | | | $C_i$ | $C_i(\bar{7})$ |
| | | | | $C_i'$ | $C_i(\bar{7})$ |
| LB | | | | $L$ | $L$ |
| | | | | $C$ | $C$ |
| LC | | | | $L_3$ | $L_3$ |
| | $L_3$ | $L_4$ | | | $L_4$ |
| | $L_3$ | $C(7)$ | | | $C(7)$ |
| | | | | $C(\bar{7})$ | $C(\bar{7})$ |

KOT

| FEATURE | SHAPE | START | END | INCLUDED | INCLUDING | (1) | (2) | (3) |
|---|---|---|---|---|---|---|---|---|
| 2 | 420 | 5 | 17 | 0 | 2 | 5 | 17 | 0 |
| 4 | 0 | 17 | 22 | 0 | 0 | 0 | 0 | 0 |
| 6 | 210 | 17 | 23 | 0 | 1 | 10 | 0 | 0 |
| 8 | 5 | 21 | 25 | 0 | 0 | 0 | 0 | 0 |
| 10 | 3 | 9 | 22 | 1 | 0 | 6 | 0 | 0 |

(IDENTIFICATION NUMBER)

FIG.15b

KLT

| FEATURE | SHAPE | START | END | VERTICAL CONNECTION | SIDEWISE CONNECTION | INCLUDED CONCAVITY | RETENTION | CHANGE |
|---|---|---|---|---|---|---|---|---|
| 1 | 4 | 3 | 11 | 9 | 3 | 0 | 4 | 1 |
| 3 | 1 | 3 | 11 | 13 | 1 | 0 | 3 | 1 |
| 5 | 4 | 8 | 10 | 0 | 7 | 2 | 2 | 0 |
| 7 | 1 | 8 | 11 | 11 | 5 | 0 | 4 | 1 |
| 9 | 3 | 8 | 13 | 1 | 11 | 0 | 1 | 0 |
| 11 | 2 | 8 | 13 | 7 | 9 | 0 | 1 | 0 |
| 13 | 2 | 9 | 21 | 3 | 0 | 10 | 3 | 1 |
| 15 | 4 | 15 | 22 | 27 | 17 | 0 | 4 | 1 |
| 17 | 1 | 15 | 16 | 0 | 15 | 2 | 1 | 0 |
| 19 | 4 | 16 | 18 | 23 | 21 | 0 | 2 | 0 |
| 21 | 1 | 16 | 19 | 25 | 19 | 0 | 2 | 1 |
| 23 | 3 | 17 | 19 | 19 | 6 | 0 | 0 | 0 |
| 25 | 2 | 18 | 25 | 21 | 8 | 0 | 1 | 0 |
| 27 | 3 | 19 | 35 | 15 | 8 | 0 | 1 | 0 |

(IDENTIFICATION NUMBER)

FIG.15c

| IDENTIFICATION NUMBER | KOLB | | | | | KORB | | | | |
|---|---|---|---|---|---|---|---|---|---|---|
| | 2 | 4 | 6 | 8 | 10 | 2 | 4 | 6 | 8 | 10 |
| COORDINATES | 12 | 9 | 19 | 11 | 21 | 16 | 12 | 22 | 13 | |
| | 10 | 8 | 18 | 11 | 21 | 18 | 12 | 23 | 13 | |
| | 10 | 8 | | 11 | 20 | 19 | 13 | 22 | 14 | |
| | 9 | 8 | | 10 | 19 | 19 | 11 | 20 | 15 | |
| | 8 | 9 | | 10 | 19 | 20 | 11 | 19 | 18 | |
| | 10 | | | | 18 | 19 | | 18 | | |
| | | | | | 17 | 18 | | | | |
| | | | | | 16 | 18 | | | | |
| | | | | | 15 | 17 | | | | |
| | | | | | 14 | 16 | | | | |
| | | | | | 13 | 16 | | | | |
| | | | | | 13 | 14 | | | | |
| | | | | | 14 | | | | | |
| | | | | | 15 | | | | | |

FIG.15d

| IDENTIFICATION NUMBER | KLB | | | | | | | | | | | | | |
|---|---|---|---|---|---|---|---|---|---|---|---|---|---|---|
| | 1 | 3 | 5 | 7 | 9 | 11 | 13 | 15 | 17 | 19 | 21 | 23 | 25 | 27 |
| COORDINATES | 14 | 12 | 13 | 13 | 7 | 13 | 21 | 11 | 10 | 22 | 19 | 18 | 24 | 7 |
| | 12 | 14 | 13 | 13 | 7 | 13 | 21 | 10 | 11 | 19 | 22 | 18 | 23 | 7 |
| | 10 | 17 | 12 | 13 | 7 | 13 | 20 | 9 | 12 | 18 | 23 | 18 | 22 | 8 |
| | 9 | 19 | 12 | 13 | 8 | 12 | 19 | 7 | | 18 | 24 | | 21 | 8 |
| | 8 | 20 | | 12 | 10 | 11 | 19 | 8 | | | 23 | | 20 | 9 |
| | 8 | 21 | | | 11 | 10 | 18 | 7 | | | | | 19 | 10 |
| | 7 | 20 | | | | | 17 | 7 | | | | | 18 | 10 |
| | 7 | 21 | | | | | 16 | 8 | | | | | 15 | |
| | 7 | 21 | | | | | 15 | 8 | | | | | | |
| | 8 | 20 | | | | | 14 | | | | | | | |
| | | | | | | | 13 | | | | | | | |
| | | | | | | | 13 | | | | | | | |
| | | | | | | | 14 | | | | | | | |

FEATURE EXTRACTION SYSTEM FOR DIGITIZED CHARACTER INFORMATION

BACKGROUND OF THE INVENTION

The present invention relates to feature extraction systems for binary coded patterns, and more particularly the invention relates to an extraction method for use with optical readers for reading handwritten characters, etc., whereby the features of a binary coded pattern stored in a two-dimensional memory by a reading unit are extracted by obtaining feature quantities of high accuracy by means of accurate separation of the regions or segments.

While there are generally different views on the definition of the features of patterns, many studies made on the recognition of characters as well as the recognition of patterns have proved that the so-called quasi-phasic features of a character or pattern such as the concavity, loop and connectivity are very important for the recognition. To date many different methods have been proposed for the purpose of extracting such quasi-phasic features and these methods can be roughly divided into the following three types of systems from the hardware point of view. More specifically, the first type is a pattern contour tracking system which may be called as a serial system, the second type is one which extracts the features of a pattern by for example raster scanning in accordance with the relation between the rows of the pattern, and the third type extracts the features by parallel processing of the whole pattern. Referring first to the third type, though there has been a progress in the LSI techniques, the use of this system in practical application requires an excessively huge cost. On the other hand, the first type has been put in practical use, although this system requires a rather long time. However, this system has a very serious disadvantage that the application of this system to the ordinary patterns is possible on the condition that an object pattern has been separated preliminarily into a plurality of segments for the tracing processing. As a result, while there will be no difficulty in the case of characters written properly within the character frame or in the case of printed characters, the application of this system is not suitable in the case of characters connected closely or in the case of ordinary patterns whose separation into segments is not necessarily an easy matter, and moreover in the case of characters which are arranged within a fixed character frame but are of complicated patterns such as "Kanji" or Chinese characters the system requires a correspondingly complicated processing making its application difficult.

Thus, the second system of extracting the features of a character by raster scanning in accordance for example with the connection between the black conditions (character digital bits) or the white conditions (background digital bits) of the successive rows of the digitized character pattern may be considered promising. This system is based in principle on the concept that the features of the succeeding two rows can be extracted and the relation between the two rows alone is considered. As a result, the required hardware for extracting the relation will be simplified considerably as compared with that of the third type system employing the parallel processing, and moreover the overall hardware can be simplified considerably through for example the parallel use of microcomputer for integrating the local features of the succeeding two rows.

Some studies have been made on the extraction of quasi-topological features in accordance with the above-mentioned connectivity characteristic between the succeeding two rows and the following disadvantages have been found to date. In other words, the scanning in rowwise direction alone has been unable to extract the concavities of any given character which are open to the right or left and thus it has been necessary to scan in the columnwise direction for this purpose. Also it has been impossible to extract L-shaped concavity features or weak concavity features and thus the use of diagonal scanning has been suggested. However, the use of diagonal scanning has been not only resulting in an awkward processing but only still inadequate for extracting the ordinary concavity features. In addition, as a matter of principle, this system is based on the integration of local features and it has the disadvantage of being susceptible to local noise. Moreover, practically no attention has been paid to the fact that the so-called concavity features may be of many different types of concavities.

SUMMARY OF THE INVENTION

It is a principal object of this invention to provide a new feature extraction system which overcomes the foregoing deficiencies in the prior art.

It is another object of this invention to provide such extraction system in which a two-dimensional bit pattern in matrix-mesh form is scanned row by row or column by column such that the local features of each unit row or column are extracted directly from the result of the scanning of the adjacent two rows or columns and the features of the unit rows are integrated to thereby extract the global features of the two-dimensional pattern.

It is still another object of this invention to provide such extraction system in which the various feature regions or segments are accurately separated and highly accurate extraction of features without any loss of information is ensured.

Namely, in accordance with the present invention, only one or the other of the rows and columns of a digitized pattern are scanned such that all the local features of every adjacent two rows or columns are detected in the form for example of concavities opened to any one of the upper, lower, left and right directions and simultaneously the detected features are suitably separated into segments and the information of each of the separated segments is represented compactly by a run length. Also the concavity features are extracted systematically to accurately describe many different types of concavities. In addition, the elimination of noise is effected simultaneously with the extraction of features with the resulting elimination of local concavity and convexity noise of such high quality which has never been attained previously.

BRIEF DESCRIPTION OF THE DRAWINGS

FIGS. 10a and 10b are diagrams showing the patterns on a two-dimensional mesh pattern which are useful in explaining the definition of noise.

FIG. 11 is a diagram showing an exemplary process of rowwise direction noise processing.

FIG. 12 is a decision logic table for the noise processing.

FIG. 13 is a diagram useful for explaining an exemplary form of feature quantity extraction process including the noise processing.

FIG. 14 is a diagram showing an exemplary manner of extracting the global features of a handwritten character pattern in the form of a two-dimensional mesh pattern.

FIGS. 15a to 15d show the segment feature tables and the segment coordinates tables corresponding to FIG. 14.

DESCRIPTION OF THE PREFERRED EMBODIMENTS

The present invention will now be described in greater detail with reference to the illustrated embodiments.

Figure 1:
FIG. 1 is a diagram showing serially the elementary patterns forming features.

Firstly, in order to give an overall image of the system according to the invention, the quasi-topological features for which the invention is intended will be described with reference to FIG. 1 showing these features in the form of elementary pattern series. In FIG. 1, the concavity features are formed into series or groups such as L-shaped, U-shaped and C-shaped groups having successively greater degrees of concavity involution and the groups are respectively labeled as L, C-0, C-1, C-2, C-3 and C-4. In the Figure, the convexities are included in the group L and they will be described later. The group C-0 shows a loop shape which is also labeled as Co. The groups other than the group C-0 each includes a modification for each of the four directions of opening of the concavity, and in the case of the group C-1 prime numbers $C_2$, $C_3$, $C_5$ and $C_7$ are respectively allocated to the modifications. Then, since in the group C-2 the concavity feature opened upper right is considered as a combined form of the modifications $C_2$ and $C_3$, the number 6 corresponding to the product of the prime numbers is assigned to the combination thus representing it as $C_6$. In the like manner, each of the other elementary patterns is represented by a number which is the product of the corresponding prime numbers. Since an integer can be generally separated linearly into prime numbers by prime factorization except the ordering, there exists one-to-one correspondence between the number of the above-mentioned numbers and shapes thus making the automatic extraction of concavity features smart. In the case of the group C-4, there exist two types of modification for each of the four directions and in this case no distinction is drawn between them but simply suffixes 1 to 4 are added to the labels. This labeling is smart mathematically and thus it is used in this embodiment. In fact, however, many different labeling methods are possible and any suitable one of them may be used. Further, while other elementary patterns which are more complicated than the group C-4 may be defined in the like manner, in the case of actual patterns such as characters, no elementary patterns of greater complexity practically appear and thus no other elementary patterns are used in this embodiment. On the other hand, while the elementary patterns Li ($i=1\sim 4$) are each classified into three types, e.g., linear, convexity and concavity types, at the initial stage the elementary patterns are extracted without making a distinction among them and the distinction is drawn later. As a result, it is necessary to use a compact representation involving no loss of information.

Figure 2:
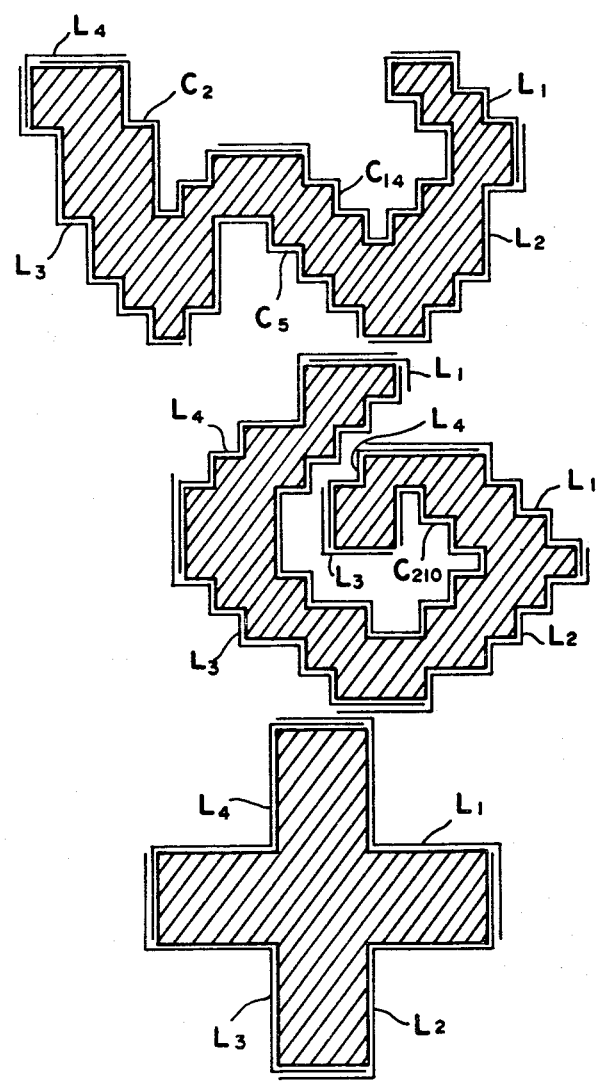
FIG. 2 is a diagram showing exemplary manners of extracting elementary patterns in the case of a two-dimensional mesh pattern.

More specifically, the pattern is given in the form of a mesh pattern on a two-dimensional memory plane and thus it is necessary to describe the manner in which the previously mentioned elementary patterns are defined with respect to the pattern on the lattice. In this case, the L-shaped elementary patterns are particularly important and examples of them are shown in FIG. 2. It should be noted here that an overlapping may occur at the end portions of the respective pattern segments as will be seen from the cross-shaped pattern in the bottom portion of FIG. 2. This is done for the purpose of simply ensuring uniformity for the definitions of the elementary patterns and this has the effect of making the processing smarter than unreasonably connecting the ends by points and of producing the results that conform to the intuition. In this case, the connected features of a given pattern, i.e., the number of connected blocks forming the pattern are global features in the strict sense of the word and it cannot be determined until the entire pattern has been scanned. However, in accordance with this invention the number of the so-called connected components is determined almost automatically as soon as the scanning is completed. A number of systems have already been make known for obtaining the number of connected components and thus will not be described in any detail.

The extraction of the desired global features has been described so far and a specific way of extracting the features will now be described.

Figure 3:
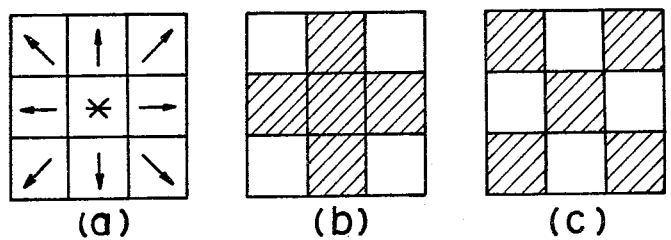
FIG. 3 shows mesh pattern portions useful for explaining the connections of the adjacent bits in the pattern.

The accurate definition of the term connectivity will be first described briefly, although it is well known in the art that the definition of connectivity for the black and white pattern on the lattice involves difficult problems. Now considering the connectivity of black conditions in terms of the center point • in FIG. 3, assuming that the point • is black information, generally it is considered that an adjoining matrix cell or mesh exists in each of the eight directions as shown by the arrows. In this case, it is called a four-connection in which only the connection of the top, bottom, left and right meshes is considered and the diagonal directions are disregarded as shown in (b) of FIG. 3, and another connection in which the diagonal directions are also considered as shown in (c) of FIG. 3 is called as an eight-connection. While, in this embodiment, the eight-connection is employed for the black conditions, the four-connection is employed for the white conditions for the purpose of preventing any contradiction. Thus, in the case of (c) in FIG. 3, it is defined that the top, bottom, left and right white unit rectangle regions are not connected with each other.

Figure 4:
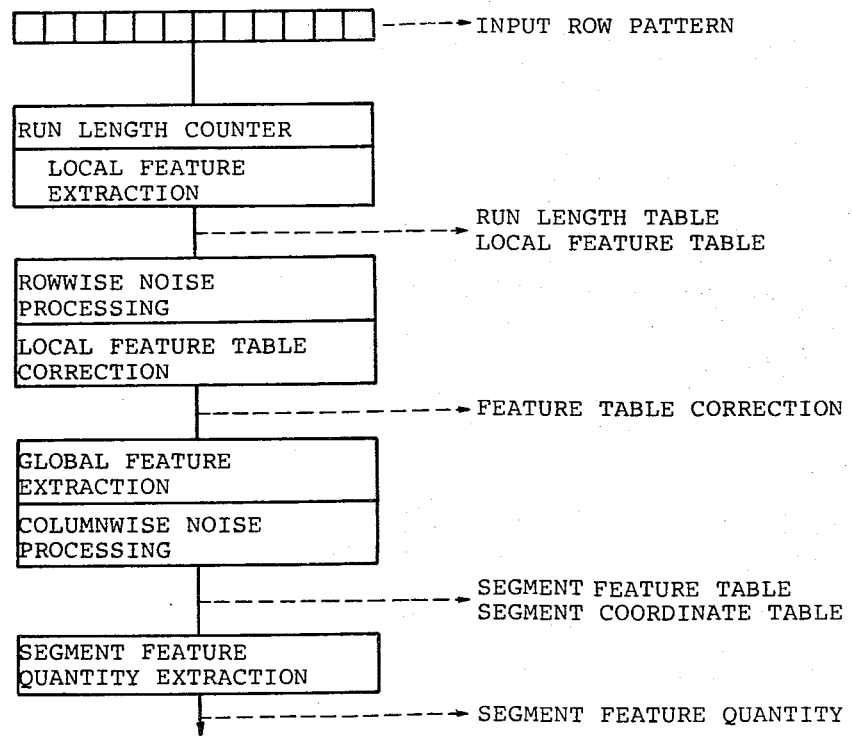
FIG. 4 is a flow chart showing the flow of a feature extraction process according to this invention.
Figure 6:
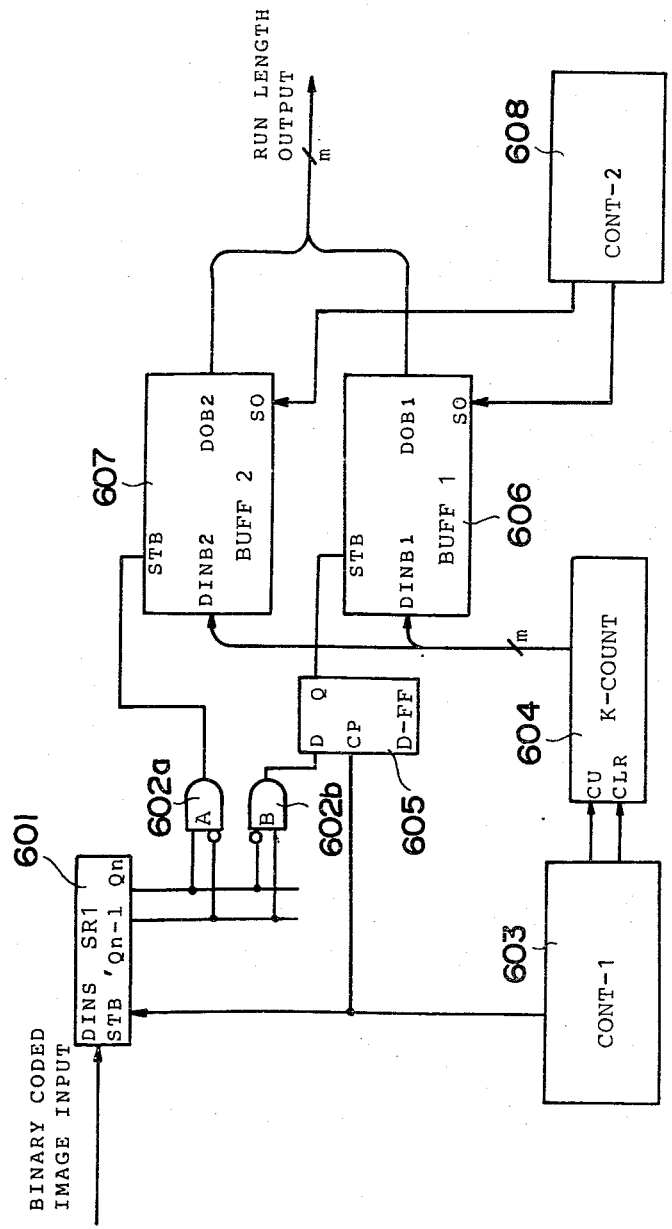
FIG. 6 is a circuit diagram showing a specific hardware for the run length counter section.

The flow chart of FIG. 4 shows a flow of specific processing steps. The input is in the form of rowwise bit arrays taken from the binary coded pattern row by row starting at the top. These arrays are called unit row patterns. In other words, the whole pattern is segmented into unit row patterns and the features of the pattern are extracted only from the connection between the adjacent unit row patterns. The unit row patterns are applied to a run length counter and a local feature extracting unit. These parts are in the form of hardware constituting a special processor. Their detailed circuit constructions are shown in FIGS. 6 and 9 and the functions of these parts will now be described before the description of FIGS. 6 and 9.

Figure 5:
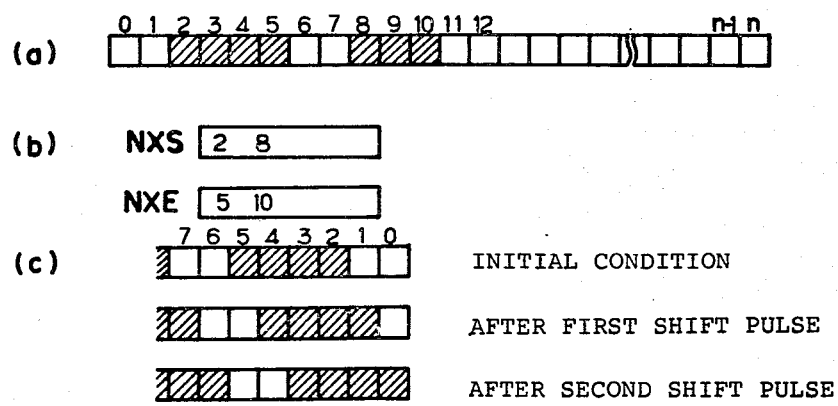
FIG. 5 shows exemplary run lengths in the form of the bit patterns in a shift counter.

Referring first to the run length counter, its output denotes a run length table as shown on the right side of the flow of FIG. 4. Here, the run length represents a run of successive black data in the unit row pattern and these blocks (runs) of black data are separated as will be described later so as to list the coordinates of starting and ending points. FIG. 5 shows an example of the counter contents, and shown in (a) is the unit row pattern. Here, it is assumed for purposes of discussion that the pattern is scanned from the left to the right and from the top to the bottom and that the leftmost bit and the next bit are always set initially to "0". It is also assumed that the respective bits are numbered from the left to the right or 0 to n as shown in (a) of FIG. 5. In the case of the run length tables for the unit row pattern in (a) of FIG. 5, two types of coordinates, i.e., the first and last coordinates of each block are respectively stored in the tables which are respectively designated as NXS and NXE. The circuitry for performing the above-mentioned function will now be described in detail with reference to FIG. 6, in which numeral 601 designates an (n+1)-bit shift register $SR_1$ adapted to receive the unit row patterns of a pattern.

In FIG. 5, (c) shows the conditions in which the unit row pattern of (a) is stored in the shift register $SR_1$. Since the zeroth and first bits are alwasy "0" in the initial condition, in the initial condition the outputs Qn and Qn−1 are always at "0" so that the outputs of A and B gates 602a and 602b always go to "0" and the following circuits are not influenced in any way. When the circuitry attains the initial condition, a control circuit 603 (CONT-1) for controlling the circuitry supplies pulses to the count-up input CU of a binary counter 604 (K-COUNT) in synchronism with the shift pulses applied to the shift register 601. On the other hand, the A gate 602a detects a change from the black to white data in the unit row pattern and the B gate 602b detects a change from the white to black data in the unit row pattern. In the case of the gate 602b, the detection takes place one bit earlier so that in relation with the shift register 601 the application of the detection position coordinate indicative output of the counter 604 (K-COUNT) to a first buffer memory 606 ($BUFF_1$) is delayed by one-bit shift time. In the like manner, the end-of-block indicative output of the A gate 602a supplies the output of the counter 604 (K-COUNT) indicating its coordinate to a second buffer memory 607 ($BUFF_2$). As a result, the two buffers form an FIFO or first-in first-out memory of an m-bit×l word capacity. Here, m is the maximum length of expected blocks and this is of course less than n−1. On the other hand, l corresponds to the number of expected blocks. Thus, the buffer memories $BUFF_1$ and $BUFF_2$ respectively store the NEX and NXS run in length tables. Of course, after one row has been scanned, the control circuit 603 applies a pulse to the clear terminal CLR of the counter 604 and consequently the counter 604 is prepared for starting the counting of run lengths for the new unit row pattern. Numeral 608 designates a controller (CONT-2) for controlling the reading of the buffer memories 606 and 607.

Figure 7:
FIG. 7 is a diagram showing feature labels and their extraction logic patterns.

Next, the extraction of local features will be described. FIG. 7 shows the labels of features which are to be listed in the local feature tables and the typical local features. Since the scaning is effected from the right to left in the rowwise direction and from the top row to the succeeding rows, in FIG. 7 a symbol TD denotes the terminal end of a block and TU denotes the starting end of the block. Each of the ends TD and TU may possibly be the end of an isolated block which does not extend over the adjacent two rows. A symbol OU denotes the ending point of an upward concavity or loop, and OD the starting point of an upward concavity or loop. Labels LA, LB and LC denote the left sides of the block, that is, LA denotes the left side downwardly slanted to the left, LB denotes the left side extending vertically and LC denotes the left side slanting downwardly to the right. Labels RA, RB and RC denote the right sides of the block and the symbols A, B and C respectively have the same significances as in the case of the labels L. The extraction logics of these features are indicated above the typical features in FIG. 7. The extraction of a feature is effected by detecting changes between the black and white conditions at the respective points in the like manner as the previously mentioned run length counter and this feature extraction is effected on each of the just preceding row (hereinafter referred to as a preceding row and designated by a capital letter P) and the currently noted row (hereinafter referred to as a current row and designated by a capital letter N). In other words, changes from the black to white condition and from the white to black condition are detected and these changes are respectively designated by WB and BW. This represents a detected pattern (designated by d) and there is also a carrier state (designated by c) for holding the detected state. The carrier state is reset when a feature itself is extracted or alternatively the carrier state changes its state in dependence on the feature detected. Generally speaking, the carrier state corresponds to the internal condition of an automaton and the detected pattern corresponds to the input to the automaton. Thus, the output or the feature is determined by the two "1" and "0" patterns as shown in FIG. 7. In the logic table of FIG. 7, a symbol • denotes a don't care condition such that the carrier state is reset if a feature including no • such as TD is extracted, whereas if a feature including a • such as DU is extracted the then current value of the bit • alone is held in the carrier state and the remainder is reset. This is one of the measures for the eight-connection processing.

It is necessary to indicate the blocks to which these local features belong. This is done by two counters 901 and 902 in FIG. 9 which will be described later. The counter 901 (PCR-CNT) is a preceding row block counter and it is only necessary for it to count each time an WB is detected. The counter 902 (NCR-CNT) is a current row block counter and similarly it is only necessary for it to count each time an WB is detected.

Figures 8, 16:
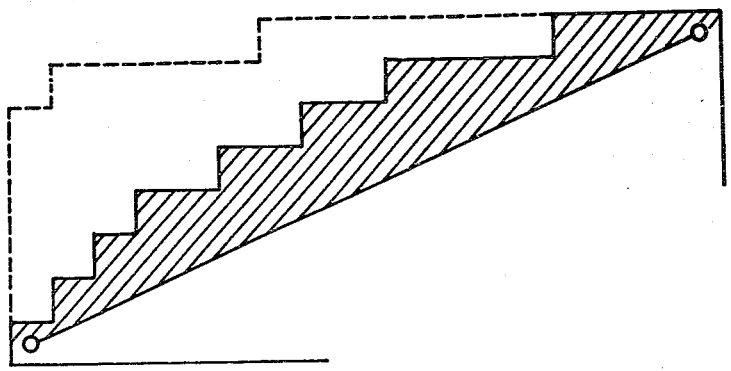
FIG. 8 is a diagram showing an exemplary process of local feature extraction.
FIG. 16 is a diagram showing an exemplary pattern useful for explaining the process of determining L-shaped concavities and convexities.

FIG. 8 shows an example of the above-mentioned local feature extraction. In FIG. 8, (a) shows the white and black patterns, the detected logic patterns, the carrier states and the corresponding extracted feature labels of a preceding row P and a current row N. In FIG. 8, (b) shows the count values of the counters PCR and NCR and the conditions in which preceding and current row block numbers are given for the respective features. In FIG. 8, (c) shows the output local feature lists and run length tables. In FIG. 8(a), designated by each $1^c$ is a carrier state "1", and in FIG. 8(c) the blank spaces indicate the disconnected conditions (flip-flops are in fact inserted).

Figure 9:
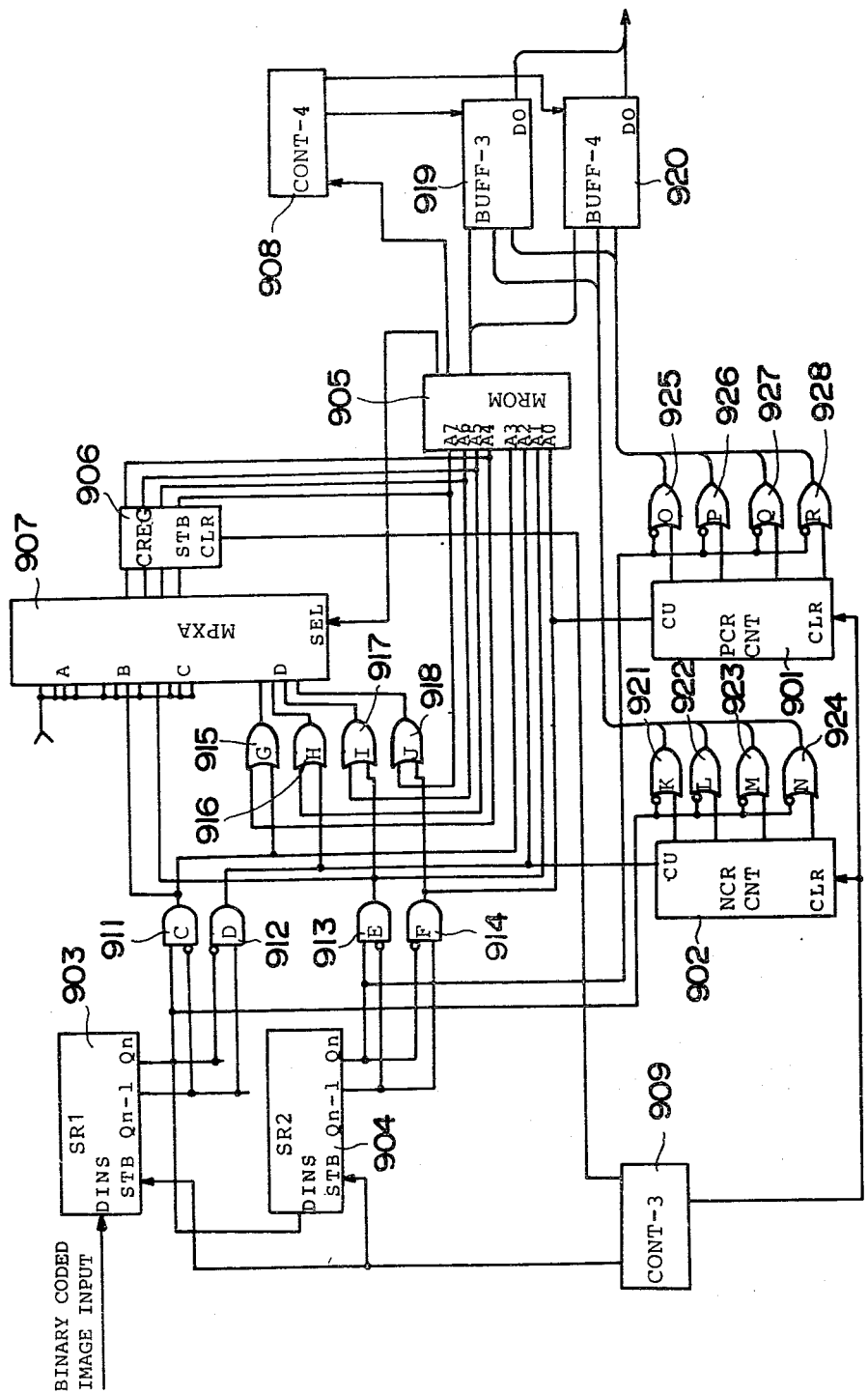
FIG. 9 is a circuit diagram showing a specific hardware for the local feature extracting section.

With the above-mentioned preparation, the local feature extracting circuit for performing the above-mentioned function will now be described with reference to FIG. 9. In the Figure, a shift register 903($SR_1$) is a current row register and a shift register 904($SR_2$) is a preceding row register. A controller 909 controls the shifting operation of the shift registers 903 and 904, and OR gates 911, 912, 913 and 914 are all the same as the case of the run length counter. The "1" and "0" patterns detected by the gates 911 to 914 are applied to the address lines $A_o$ to $A_3$ of a read-only memory 905 (MROM). On the other hand, a register 906 (CREG) holds the carrier states so that under the control of the controller 909 the "1" and "0" patterns of the carrier states are similarly applied to the terminals $A_4$ to $A_7$ of the memory 905 and the patterns are also fed back via OR gates 915, 916, 917 and 918 and a multiplexer 907. As a result, once the register 906 comprising a J-K flip-flop has been turned on, this on-state is maintained irrespective of the presence or absence of the J input until it is reset by the K input.

The control dictated by the feature extraction logics and the result is performed by the memory 905 and in this case the detected patterns and the carrier states determine an address as mentioned previously. For example, the logic patterns (d, c,) of the feature TD are $(1000,0100) = 84_{(16)}$ so that the label TD is written at the address 84 of the memory 905 and its extraction results in the resetting of the carrier states. Thus, the memory 905 also stores an instruction for causing the multiplexer 907 (MPXA) to select its input A. Of course, the memory 905 also sends a signal to a control circuit 908 (CONT-4) for generating an output. The address of the feature OU is determined in the like manner. For example, considering the don't care condition in the logic patterns, the label of OU is written at two addresses, i.e., the addresses 48 ( $\cdot$ =0) and 68 ( $\cdot$ =1) and an instruction is also written for causing the multiplexer 907 (MPXA) to select its input B. As a result, when the address corresponding to a feature is applied, the memory 905 (MROM) performs a matching between the input and its stored contents and the corresponding label and control are read out.

Next, a feature connection block number is determined by the counters 902(NCR-CNT) and 901(PCR-CNT) which respectively count each time a change from the white to black condition is detected by the gates 912 and 914, respectively. When the feature is extracted, the outputs of the counters 902 and 901 are simultaneously sent to a buffer circuit 919 (BUFF3) or 920 (BUFF4) and these buffer circuits produce label bit patterns as well as local feature tables. Also gates 921 to 928 or K to R are provided so that when there is no connection between the blocks, flip-flops are inserted to deal with the situation. The control circuit 908 (CONT-4) controls so that the local feature tables are alternately stored in the buffer circuits 919 (BUFF3) and 920 (BUFF4).

In accordance with this invention the elimination of local noise is accomplished simultaneously and this is done as shown in FIG. 4 such that the rowwise noise elimination is effected and simultaneously the local feature tables are corrected in accordance with the noise processing.

What is meant here by the term noise will now be described with reference to FIGS. 10a and 10b. In this case, what is intended is to ignore concavity noise of 1-mesh depth which occurs frequently and more specifically the concavities $N_1$, $N_2$ and $N_3$ in FIG. 10a must be ignored as noise. As a result, the adjacent convexities·1 and·2 will also be ignored. However, if the processing is performed while correcting the local feature tables from the right to left, a convexity·4 will remain as the normal TU feature. On the other hand, in FIG. 10b a concavity N will be considered as noise at the first sight. However, if the concavity·1 on its left side is ignored, the connected block will be broken off. Thus, it is assumed that the concavity N will not be regarded as noise in cases where such ignoring results in the breaking of the connection.

While it is necessary to examine the patterns of the consecutive three rows (designated by B, N and A) in order to determine the presence of noise in accordance with the above-described definition of noise, the present invention is based on the principle that only the connection between the adjacent two rows (B and N or N and A) is always observed and consequently the noise processing for the three unit row patterns is accomplished in accordance with the two two-rows connections. More specifically, the noise processing for the current row (the row N) is accomplished in accordance with the just preceding feature table (hereinafter referred to as a LIST(B-N)) and the current local feature table (hereinafter referred to as a LIST(N-A)). FIG. 11 shows an example of this processing and FIG. 12 shows the decision tables for this noise processing. In FIG. 12, designated by (n−) is the position where a feature is first located when a block is examined from the right to left. For example, a symbol N(n−) denotes the block number of the feature at that position in the row N. Also, a symbol (n) designates the location where the next feature is present. For example, a symbol N(n) designates the block number at that position in the row N. Thus, N(n−)→N(n) denotes that the location is changed to the preceding block number. Here, there is a relation n≧i between the n and a block number i.

Referring to the LIST(B-N), only the upwardly projected convexity or TU has the possibility of being noise. If its block number in the row N is i, then the leftmost one of the blocks numbered i in the row N is looked for in the LIST(N-A) and its local feature label is examined. The subsequent processing differs depending on whether the label is TD, L type or OU as shown in FIG. 12. If the label is TD, the feature is tentatively considered as an isolated noise and eliminated (shown by an X mark) and in this case it is in fact necessary to make a decision in accordance with a threshold value calculated from the run length tables. In the case of the L type, if the immediately following label is OD, the feature, corresponds to the case of FIG. 10a and thus it is not considered as noise and left as such. If the label is the R type, the feature is a simple projection and it is left as such. If the label is OU, the feature is noise and it is eliminated. More specifically, the TU and L type columns of the LIST(B-N) and LIST(N-A) are cancelled. As the result of this cancellation, the label OU is no longer OU and it becomes LA. Thus the necessary change is also effected. While, in the same lists, the feature OU is not connected with the row A, this cancellation connects it with the row A. This is equivalent with that of the cancelled L type and it is inserted in this column. In the event that the label of the LIST(N-A) corresponding to the TU is OU, if the next label is OD, the feature corresponds to the case of FIG. 10b and it is left as such. If the next label is the R type, the feature is noise and it is cancelled. However, the label OU is no longer OU and it is changed to LA as mentioned previously. On the other hand, as the result of the connection with the row A, its number becomes the number of the label which is found first when the LIST(N-A) is traced back leftward. The reason is that the connection of TU and OU might have included the convacity and convexity and they might have been cancelled successively. Also in the case of the LIST(N-A), there is the possibility of noise only when the label is TD in which case the corresponding label of the LIST(B-N) is examined and the noise processing is performed in accordance with the processing procedure shown in FIG. 12.

The corrected LIST(B-N) and LIST(N-A) are thus obtained by the above-described processing. In this case, the uncancelled block numbers in the two lists are retained as such on the ground that if they were changed, confusion would be caused when referring to the run lengths since the run lengths were determined by the block numbers. Also, while the LIST(B-N) is a completely corrected local feature table, the other LIST(N-A) may possibly be corrected in relation with the following list and in this case the LIST(N-A) becomes the LIST(B-N). Thus, the lists are successively subjected to the noise processing and the corrected local feature lists are produced.

With the above-described preparation, the final objective or the phase of global feature extraction will now be described. This is a so-called definite integral of local features and each of the extracted features is subjected to a different integration processing. This processing as a whole is shown in FIG. 13. Of the ten local features TU, TD, OU, OD, RA, RB, RC, LA, LB and LC shown in FIG. 13, the contents of OD and TU are the simplest of all. This is a sense means the starting point of integration, that is, the generation of a downwardly opened concavity $C_5$ in the case of OD and the generation of $L_1$ and $L_4$ in the case of TU. In the case of TD, the processing may be considered as a processing of the least upper bound of definite integral and here it is referred to as an ending process. While this process may be any one of various processing procedures depending on the preceding condition of TD, the simplest procedure is used when the preceding condition includes $L_2$ and $L_3$, that is, when the preceding condition is like the lower part of a wedge. In this case, the feature TD is simply treated as a top feature and the two shapes $L_2$ and $L_3$ which have been integrated are completed. In the case of TD, however, there are many cases where the preceding condition includes a concavity. Roughly classifying, the cases differ depending whether the preceding condition includes a shape $C_3$ or $C_7$ in relation with $L_i$ ($i=1 \sim 4$). In FIG. 13, the concavity including $C_3$ is designated as $C(3)$ and the concavity without $C_3$ is designated as $C(\bar{3})$. As regards the shape $C_7$, the similar concavities are designated as $C(7)$ and $C(\bar{7})$ in FIG. 13.

Also in the case of the above TD, from the standpoint of uniformity and exactness of the processing, if for example the preceding condition includes $L_1$ and $L_3$, the generation of $L_2$ always occurs at the termination and also they are terminated there. Such cases are parenthesized in FIG. 13.

On the other hand, there are cases where a sort of ending takes place from the procedural point of view but a new concavity or loop is simultaneously produced. A typical example is the combining of $L_1$ and $L_4$ at OU to form a concavity $C_2$. This is indicated as $L+L \rightarrow C$ in the column of OU in FIG. 13. Referring to the formula $L+Ci \rightarrow C'i$ in the next column, the suffix i is the identification number affixed to the label C and it means that if the local feature noted in the course of integration belongs to the preceding shape, the same number is assigned to the feature. The formula denotes that the shape L is absorbed by the shape Ci and the resulting new concavity $C'$ is indicated by the same identification number thus maintaining the connectivity of the shapes. The next formula of $Ci_1+Ci_2 \rightarrow C'i_1$ denotes that if the two concavities are combined into a new concavity $C'i_1$, the identification number of the earlier concavity is used as that of the new concavity. Another formula $Ci+Ci \rightarrow Oi$ indicates that a loop is produced by the two concavities.

The process of the remaining R and L types is basically the process of integration itself. This is particularly true in the case of the features RB and LB and they involve no processing procedure except the connected portions. Also there are cases where a new concavity is composed and an example is the composition of RA which in turn is designated by $L_2-C(3)$. This indicates that when the RA is extracted in the preceding condition of $L_2$, the direction of the contour is reversed there and a concavity $C(3)$ is produced. Thus, by virtue of this processing, any concavity feature opened left or right is extracted by the rowwise scanning alone.

While the processing procedures for global feature extraction have been described briefly, it is important that all the processing results of the integration and the necessary parameters are listed in the form of segment feature tables and regional coordinate tables. As a result, the separation of segment features is effected simultaneously with their extraction and the results are then coded by the run length encoding into compact form without any loss of information. The data are then delivered to the next extraction step of segment feature quantities or the extraction phase of minutes feature quantities.

Figure 14:
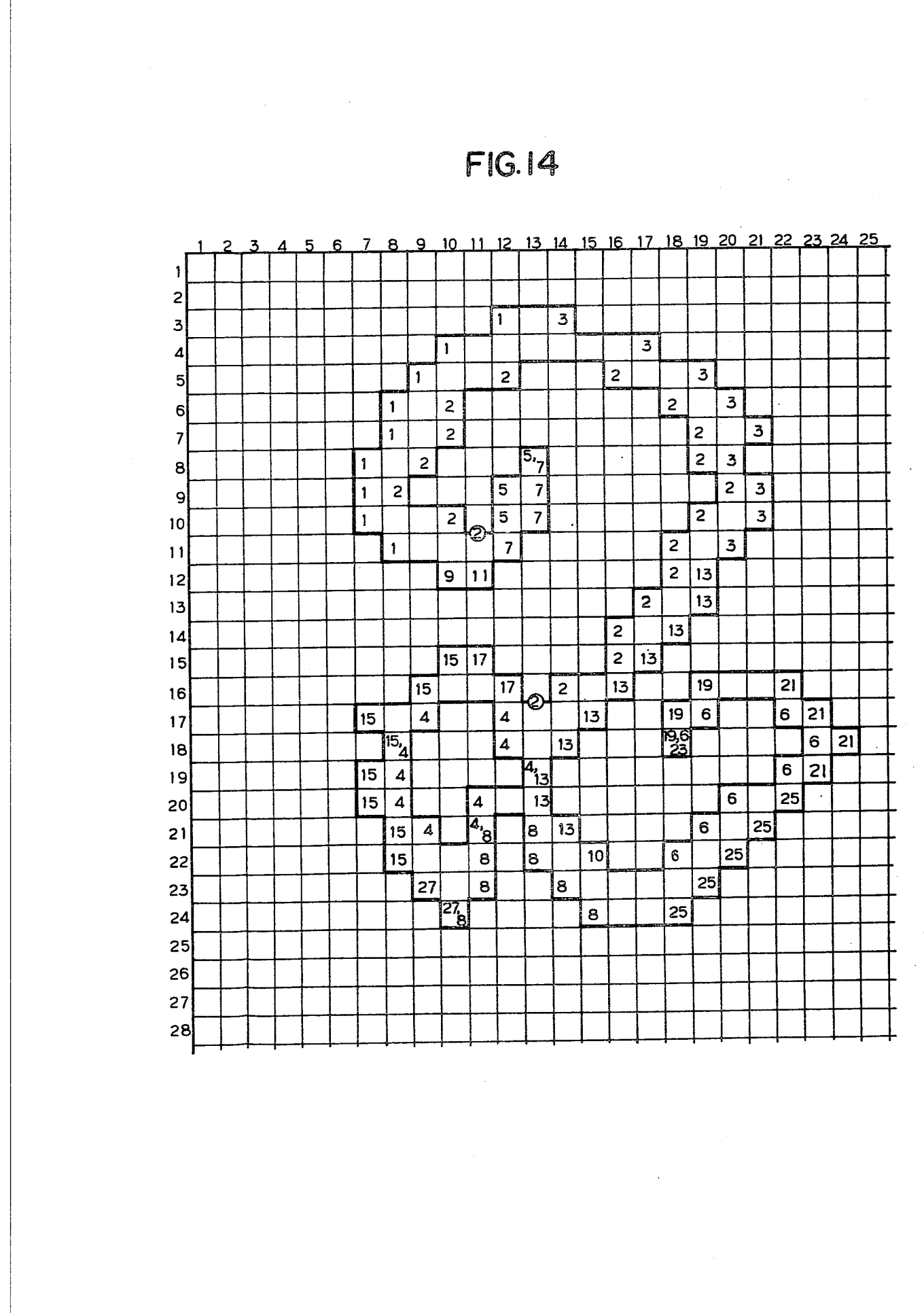

FIG. 14 shows an example of the above-mentioned global feature extraction. FIG. 14 shows the case of a handwritten letter "2" and FIGS. 15a to 15d show the extraction results of this complex handwritten letter. FIGS. 15a and 15b show the segment feature tables and FIGS. 15c and 15d show the regional coordinate tables.

On the other hand, the columnwise noise processing performs the elimination of concavity noise of 1-mesh depth serially from the top to the bottom in the same manner as the previously mentioned rowwise noise processing and thus it has the similar nature as the rowwise noise processing. This columnwise noise processing will be described in greater detail with reference to FIG. 14. At the rightmost end in the 8th row of FIG. 14 there is concavity noise of 1-mesh depth which is to be eliminated and consequently the convexity at the rightmost end of the 7th row must be disregarded. Also the feature RA is extracted at the rightmost end of the 7th row (the mesh defined by the 7th row and the 21st column). Before this, the same RA exists since the occurrence of the first TU and the initially produced $L_{1\text{-}3}$ (the suffix 3 is the identification number) is maintained. Then, the feature RC is extracted at the rightmost end of the 8th row (the 8th row, the 20th column) and its direction is reverse to that of RA. However, since the change is only equal to one mesh, it is considered as a continuation of the $L_1$ in view of the possibility of the feature being noise. Thus, in the L type feature table of FIG. 15b the retention of the KLT identification number (3) is increased by 1 to "3" and the change flag is set to "1" as the result of the change. The identification numbers are placed in the meshes of FIG. 14 in correspondence with FIGS. 15a to 15d. Hence, the term retention indicates the continued length of run of the columns in the column direction. In this case, since the feature is considered as noise, the convexity of the 7th row is neglected and the column run is considered as continuing, thus increasing the retention by 1. Also at the rightmost end of the 9th row a feature RA is extracted and it is also detected as noise. Thus, the KLT retention is updated to "1" and the change flag is reset to "0". While the description has been made by using the term rightmost end which is readily understandable by intuition, strictly speaking the connection of blocks is in fact pursued and this will not be described since it goes into excessive detail and becomes redundant.

It will be seen from the foregoing description that the extraction of quasi-topological global features is effected while performing the columnwise noise elimination and simultaneously a variety of their variations are accurately described. An example of such variations is included in the concavity segment feature table KOT of FIG. 15a. Namely, it is the concavity of the identification number (2) in FIG. 15a and this concavity indicates the involuted concavity inside the upper part of the character "2" in FIG. 14. Its shape is designated by 420 which can be solved into prime factors of $2^2 \cdot 3 \cdot 5 \cdot 7$ showing that the concavity comprises two of $C_2$ and each of $C_3$, $C_5$ and $C_7$. The column "including" shows the number of the global features included and their identification numbers are indicated in the columns (1), (2) and (3). The path of the identification numbers (2) in this concavity is described by the left and right coordinates of the run lengths and they are successively shown in the segment coordinate tables KOLB and KORB of FIGS. 15c and 15d. In this way, when the global features are extracted, their segments are simultaneously separated and maintained without any loss of information.

The final phase is to extract the feature quantities of the segments separated in the above-mentioned manner and particularly important in this case is to distinguish the L-type concavity, convexity and straight line from one another. In the case of a continuous curve, from a common sense point of view it is seen that what is necessary is to work out the differential of the second order. However, while an obvious result may be obtained in the case of an angular shape such as is shown by the broken line in FIG. 16, in the case of a gradually inclined shape such as shown by the solid line it is impossible to obtain any evident result due to the digital pattern. Thus, as regards the separation, since the coordinates of the ends of the shape L are known, a straight line is drawn to connect the ends as shown in the Figure so that the projections from the straight line such as the hatched portions can be easily calculated and thus the convexities can be continuously obtained by performing a suitable normalization in accordance with the projected lengths. However, this method is not so sensitive to describe the degree of the angles and it is used in combination with the previously mentioned differential of the second order to extract the shape of the convexities with greater accuracy.

In addition to the foregoing, there may be many other methods for obtaining the feature quantities of global feature segments. However, their description goes into excessive detail and will not be described.

It will thus be seen that in accordance with the present invention the segments are accurately separated and the data are maintained without any loss, thus making possible the extraction of various high-degree feature quantities.

What is claimed is:

1. A method of extracting, for the purpose of recognition processing, character features from a character pattern detected by an optical scanner, digitized into character digital bits and background digital bits and stored in a two-dimensional memory, said method comprising the steps of:
   (a) scanning said character pattern on the two-dimensional plane of said memory sequentially row by row to detect unit row pattern blocks each including a single row bit array;
   (b) separating from each of said unit row pattern blocks predetermined parameters including a run of a series of character digital bits and respective run length data and coordinates data for each run of each said block;
   (c) for each of said scanning steps, comparing the respective detected unit row pattern block with the unit row pattern block detected by the just preceding scanning such that in accordance with variations in the detected parameters in the compared unit pattern blocks, types of local features are detected in the form of a concavity opened upward, downward, left and right, and extracted and listed in correspondence with the compared unit pattern blocks; and
   (d) successively integrating said local features extracted by each said scanning step, coding the results obtained in the course of the step of successively integrating and the predetermined parameters including run length data and then listing feature quantities and coordinates of respective segments as global features.

2. A method according to claim 1 further comprising a local feature list correcting step, wherein of the local feature lists produced by said step (c), the local feature lists by said just preceding scanning and the local feature lists by said respective scanning are used to perform a noise processing on the unit pattern block produced by said just preceding scanning so as to neglect concavity features of 1-bit depth in a direction opposite to the direction of the scanning and thereby to effect correction of the local feature lists.

3. A method of extracting, for the purpose of recognition processing, character features from a character pattern detected by an optical scanner, digitized into character digital bits and background digital bits and stored in a two-dimensional memory, said method comprising the steps of:
   (a) scanning said character pattern on the two-dimensional plane of said memory sequentially column by column to detect unit column pattern blocks each including a single column bit array;

(b) separating from each of said unit column pattern blocks predetermined parameters including a run of a series of character digital bits and respective run length data and coordinates data for each run of each said block;

(c) for each of said scanning steps, comparing the respective detected unit column pattern block with the unit column pattern block detected by the just preceding scanning such that in accordance with variations in the detected parameters in the compared unit pattern blocks, types of local features are detected in the form of a concavity opened upward, downward, left and right, and extracted and listed in correspondence with the compared unit pattern blocks; and (d) successively integrating said local features extracted by each said scanning step, coding the results obtained in the course of the step of successively integrating and the predetermined parameters including run length data and then listing feature quantities and coordinates of respective segments as global features.

4. A method according to claim 3 further comprising a local feature list correcting step, wherein of the local feature lists produced by said step (c), the local feature lists by said just preceding scanning and the local feature lists by said respective scanning are used to perform a noise processing on the unit pattern block produced by said just preceding scanning so as to neglect concavity features of 1-bit depth in a direction opposite to the direction of the scanning and thereby to effect correction of the local feature lists.

* * * * *